Jan. 26, 1960 | W. K. M. KLEINE | 2,922,322
DRILL MECHANISM
Filed May 26, 1958
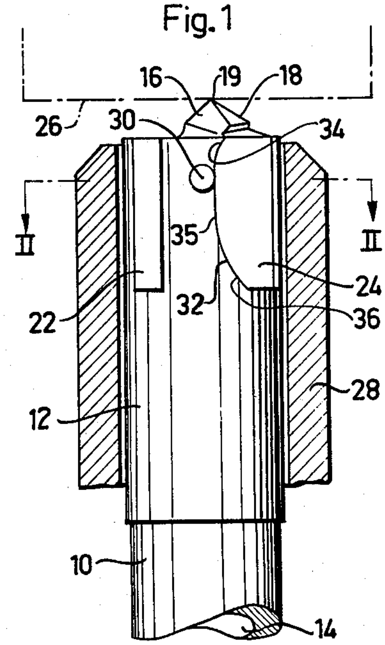
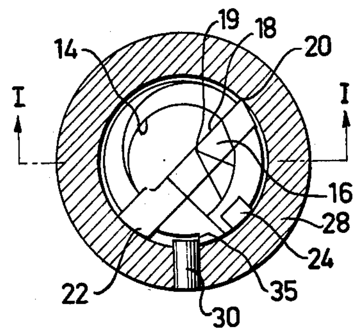
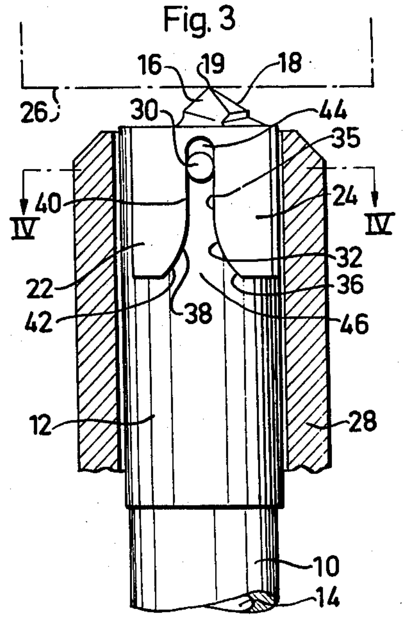
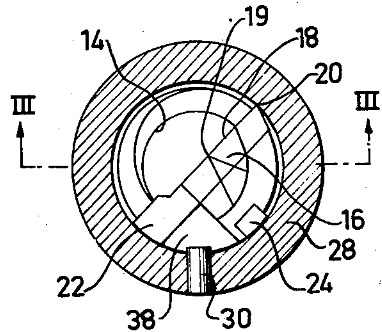
INVENTOR:
WERNER KURT MAX KLEINE
BY Eric Y. Munson
Attorney United States Patent Office 2,922,322

Patented Jan. 26, 1960

2,922,322

DRILL MECHANISM

Werner Kurt Max Kleine, Bremen-Mahndorf, Germany

Application May 26, 1958, Serial No. 737,718

6 Claims. (Cl. 77—5)

This invention relates to drill mechanisms.

More particularly this invention relates to drill mechanisms comprising a longitudinally channelled drill head rigidly secured to a hollow drill rod, e.g. by a screw wedge or similar mechanical connection or by welding or soldering.

In all drill mechanisms of this type the drill head has one or a plurality of cutting edges and is provided with supporting shoulders. They are constructed so as to be capable of being chucked with their one end to a drill machine and with their other end to carry the head provided with said cutting edges and supporting shoulders to be advanced towards and into the workpiece to be provided with a bore.

It is immaterial for this type of drill mechanism whether the drill mechanism solely or the workpiece solely or both rotate under the drilling operation and whether the advancing movement of the mechanism relatively to the workpiece is effected by a displacement of the mechanism or the workpiece or both.

Still more particularly this invention relates to drill mechanisms of the type comprising a drill head rigidly secured to a hollow rod and having a plurality of cutting edges disposed so as to have the resultant of all cutting forces attacking eccentrically relatively to the longitudinal axis of the mechanism. Due to this feature the bending stresses acting on the drill head or tilting movements and transversely acting forces are eliminated by the reaction forces acting on said guide members, the longitudinally acting forces as well as the torque being guided through the drill rod from the clamped end to the opposite end thereof. The cutting edges and the guide members project out of the circumferential face of the drill head.

A cooling and lubricating medium such as compressed air or oil is fed through the space between the drill head and the wall of the bore or hole under production in the workpiece to the zone of actual cutting. Said medium returns together with chips released by the cutting operation through the channel in the drill head and the drill rod.

Drill mechanisms of the kind set forth permit very high advance speeds in the drilling of deep and also short bores. During the initial penetration of the drill head into the workpiece the drill head is guided by a centering member until the drill head has advanced into the workpiece deeply enough to guide or center itself in the first part already cut out of the bore or hole under production.

Particularly during the initial penetration step the drill head and the drill rod have to transfer momentous torques. The drill rod acts as a kind of torsion spring. The torsional vibrations have a detrimental effect on the cutting edges of the drill mechanism. Said detrimental effect is particularly prominent if the cutting edges are formed on a cutting bit made of hard metal, i.e. a metal harder than that of which the drill head is made and normally consisting of metal carbide and similar metal compounds. Therefor, the wear is particularly great during the initial step of the drilling operation which has unfavourable effects on the following steps of said drilling operation.

One main object of this invention is to provide a drill mechanism of the type set forth and embodying means adapted to completely avoid or at least considerably reduce said torsional vibrations.

A further object of this invention is to provide a drill mechanism of the type set forth, the cutting edges of which are less subjected to wear during the initial step of the drilling operation than in mechanisms hitherto known of the type in consideration.

Still an object of this invention is to provide a drill mechanism of the type set forth, the cutting edges of which constituted by cutting bits made of a hard metal, are effectively protected against becoming shaken loose by impact vibrations and shocks.

Further objects and advantages of the invention will become apparent from the following description, considered in connection with the accompanying drawing which forms part of this specification, and of which:

Fig. 1 is an elevation of a drill mechanism constructed according to the invention and a guide sleeve surrounding said mechanism and illustrated in a longitudinal section following line I—I of Fig. 2.

Fig. 2 is a top view of the drill mechanism shown in the Fig. 1, the guide sleeve surrounding said mechanism being illustrated in a transversal section following II—II of Fig. 1.

Figs. 3 and 4 are similar views as shown in Figs. 1 and 2, respectively, of a second embodiment of the invention, the sleeve surrounding the drill mechanism being illustrated in Fig. 3 in a longitudinal section following IV—IV of Fig. 4 and in Fig. 4 in a transverse section following III—III of Fig. 3.

Referring to the drawing, the drill mechanism shown in Figs. 1 and 2 or 3 and 4, respectively, comprises a rod 10 carrying a sleeve-shaped drill head 12 rigidly secured to said rod by screw connection and provided with an interior channel 14 continuing into the drill head 12. The free end of the drill head 12 has a cutting bit 16 secured thereto, said cutting bit having stepwise disposed cutting edges 18 extending outwardly from the central axis of the drill head to a point 19 located in the embodiments illustrated slightly displaced relatively to said central axis of the mechanism. Said edges thus are for their major part laterally displaced relatively to said axis. The cutting bit 16 further has an axially extending edge 20. In both embodiments illustrated the cutting bit is shaped as a bar-like member extending substantially diametrically of said drill head. On the side remote from the edge 20 said cutting bit is formed as a bearing surface 22, constituting a feature which is described more detailed in my co-pending patent application Serial No. 410,261 filed February 15, 1954.

The mechanism illustrated further carries a separate bearing member 24 extending radially from the circumference of the drill head 12 and positioned between the edge 20 and the bearing surface 22. The cutting edge 20 and the bearing surface 22 as well as the bearing member 24 project slightly from the cylindrical mantle of the drill head 12. Both the cutting bit 16 and the bearing member 24 are formed as separate members made of metal harder than that of said head and fixed thereto in any convenient manner such as welding or soldering.

In Figs. 1 and 3 the dotted lines denoted by 26 designate a rotating workpiece. The drill mechanism is assumed to have reached a position in its advancing movement where the point 19 of the cutting edges 18 formed on the drill head has come in contact with the workpiece. In this position the drill head 12 is surrounded by a centering sleeve 28 provided with a radially inwardly projecting pin 30. The centering sleeve 28 has to guide the drill head during the initial penetration of the drill head into the workpiece, until the drill head has advanced into the workpiece deeply enough to guide or center itself by its sleeve-shaped mantle bearing against the wall of the first part already cut out of the bore or hole under production. For this reason the interior diameter of the centering sleeve is equal to the diameter of the circle circumscribing the edge 20 and the bearing surfaces 22 and 24.

In the embodiment shown in Figs. 1 and 2 the bearing surface 24 is formed to constitute a guide 32 extending in an axial direction and intended to co-operate with the pin 30 on the centering sleeve 28. The pin 30 projects into the space surrounded by the sleeve 28, its freely projecting end approaching the cylindrical mantle surface of the drill head 12. The guide 32 is formed with a guide edge 35 extending in the axial direction of the mechanism between a short external curved recessing part 34 and an internal curved recessing part 36.

In a chuck, not shown, of the drill machine the mechanism rod 10 is clamped with such angle of torsion as to cause the guide 32 with its guide edge 35 to bear on the pin 30 immediately adjacent the front face of the drill head 12 during advance of the drill mechanism towards the workpiece 26, until the contact between the latter and the drill head is established.

When continuing the advancing movement of the head 12 relatively to the workpiece, the guide edge 35 slides past the pin 30 so as to subject the head to a peripheral torsion effected in a clockwise direction viewed in the drawing plane of Fig. 2. This direction of the torsion is in the same direction as the rotation of the mechanism and the workpiece relatively to one another is performed. When the cutting bit 16 abuts against the workpiece 26 the torque is thus immediately transferred through the pin 30 to the drill machine without rendering possible any returning spring movement of the rod 10, since said rod is not loaded but successively in response to the torque due to the further sliding movement of the pin 30 along the longer portion 36 of the guide 32. Upon termination of this movement the drill rod and also the drill head 12 and the cutting bit 16 are no longer capable of performing a returning spring movement, since the cutting tool is engaged in the cutting operation with the totality of its edges.

As a result the sudden shock-like torque to which the drill head and the drill rod are subjected during the initial step of the drilling operation is prevented from causing any other but very small and effectively damped torsional vibrations in the rod 10 which could be transferred to the cutting bit 16.

During the initial step of the drilling operation the axial guide edge 35 of the guide 32 bears on the pin 30. The torque acting on the drill mechanism reaches its maximum when the cutting bit 16 is entering into the workpiece with its entire breadth. During this step of operation the drill rod 10 is subjected to the full torsion depending on the torque. During the continuing sliding movement of the pin 30 along the portion 36 of the guide 32 due to the progress of the advance of the drill head the contact between said pin and said portion 36 will be finished. The drill head performs its further drilling movement through the workpiece with its drill rod 10 subjected to the full torsional load. This implies final elimination of the return spring tendency transferred from the drill rod 10 to the cutting bit 16.

When the bore or hole in the workpiece is finished and the drill head with its cutting edges projects out of the workpiece on the opposite end thereof, the drill rod is released from the torque. It thus returns together with the drill head into its initial position. The recessing lower portion 36 of the guide 32 serves to permit release of the drill head from the centering sleeve 28 when the drill head is retracted. During this operation the portion 36 slides along the pin 30 causing a temporary corresponding torsion of the drill head.

In the embodiment shown in Figs. 3 and 4 not only the guide member 24 but also the guide surface 22 is provided with axially extending guides 32 and 38, respectively. The guide 38 has a portion 40 extending in parallel to the longitudinal axis of the drill mechanism and a curved recessing portion 42. The portions 35 and 40 extending in parallel to said longitudinal axis merge adjacent the free end of the drill head at 44. In this way a slot 46 is formed on the drill head, said slot having partly parallel guide edges and a portion widening in the direction from said free end. The slot 46 is adapted to co-operate with the pin 30 provided on the internal cylindrical face of the sleeve 28. In the moment of impact said pin 30 is between the parallel guide edges 35 and 40 and thus secured against torsion relatively to the sleeve 22 in both directions.

The rearward enlargement of the slot 46 has for its object to guide the drill head of the drill mechanism after the workpiece has been pierced by the pin 30 when the drill head is retracted to its initial position.

Due to the curved portions of the guides the drill head is given a negative or positive initial torsion relatively to the torque acting on the workpiece during the initial step of the drill operation. If said initial torsion exceeds the torsion resulting from the angle of torsion produced by the normal torque, the drill head is caused gradually to set up during its initial and continued penetration into the workpiece. If said initial torsion is to small, the drill head is not exposed to be turned in a shock-like manner to the larger angle of torsion because it is prevented from such angular movement by the pin 30. In this case also the drill head and the drill rod rigidly secured thereto is capable of gradually only taking the position of the angle of torsion which corresponds to the torque to which the workpiece is subjected.

It is easily understood that the guides 32 and 38 and the pin 30 may change their places so that the former is provided on the sleeve 28 and the latter on the drill head 12. One or both of the guides 32 and 38 instead of being formed on the bearing member 24 and the bearing surface 22, respectively, could constitute integral parts of the drill head 12.

In a rotating drill mechanism intended to produce bores into rotationally stationary workpieces the end of the drill rod clamped to the chuck is provided with members adapted to impart a rotational motion to said drill rod and the drill head rigidly secured thereto. The centering sleeve for the drill head is preferably caused to perform a rotative movement in the same direction and the pin transferring the torque is suitably mounted on the centering sleeve whereas the guide or slot with which said pin co-operates is formed on the drill head.

While several more or less specific embodiments of the invention have been described, it is to be understood that this is for purpose of illustration only and that the invention is not to be limited thereby, but its scope is to be determined on the appended claims.

What I claim is:

1. A drill mechanism for machining workpieces chucked to a drilling machine under rotation of at least one of said parts relative to said other part, said mechanism comprising a drill head having its one end provided with cutting edges and its other end attached to a tubular drill rod, a centering member surrounding the drill head under the initial steps of a drilling operation, one of the elements of the group constituted by the drill head and the centering member being provided with at least one guide extending parallel to the longitudinal axis of the drill mechanism, a stop formed on the other element of said group and arranged for co-operation with the first element so that during the initial penetration of the drill mechanism into the workpiece it will guide said stop along said guide member to subject at least the torque transmitting part of the mechanism to an initial torsion in a direction coinciding with or opposite to the direction of action of the torque.

2. A drill mechanism for machining workpieces chucked to a drilling machine under rotation of at least one of said parts relative to said other part, said mechanism comprising a drill head having its one end provided with cutting edges and its other end attached to a tubular drill rod, a centering member surrounding the drill head under the initial steps of a drilling operation, one of the elements of the group constituted by the drill head and the centering member being provided with at least one guide extending parallel to the longitudinal axis of the drill mechanism a stop formed on the other element of said group and co-operating with the first element so that during the initial penetration of the drill mechanism into the workpiece it will guide said stop along said guide member to subject at least the torque transmitting part of the mechanism to an initial torsion in a direction coinciding with or opposite to the direction of action of the torque prior to the beginning of the drilling operation proper and during the penetration of the drill head into the workpiece with said initial torsion effective in a predetermined direction favourable for the drilling operation in progress.

3. In a drill mechanism as claimed in claim 1, said guide having such dimension in the peripheral direction of the drill head as to subject said drill head during its penetration into the workpiece to an initial torsion acting in the same direction as the torsion produced by the cutting moment.

4. In a drill mechanism as claimed in claim 3, said guide being formed with a guide edge extending in the axial direction of said mechanism and projecting peripherally relative to adjacent lateral portions of said guide.

5. A drill mechanism as claimed in claim 3 wherein there are two guides formed each with a guide edge, said guide edges extending parallel to the longitudinal axis of the drill mechanism an adjacent lateral portion located remote from the drill head end, said guide edges being in recessed relation thereto and carrying the cutting edges and merging adjacent said drill head end so as to form a slot closed at one end and for its major part extending parallel to said longitudinal axis and at its other end formed with a gradually widening opening.

6. A drill mechanism as claimed in claim 1 comprising a drill head provided with supporting faces radially projecting out of the circumference of said head, at least one of said supporting faces along one lateral edge thereof being formed as guide, and a pin radially inwardly and radially projecting from the centering member and co-operating with said guide.

No references cited.